United States Patent [19]
Johnson et al.

[11] Patent Number: 5,961,655
[45] Date of Patent: Oct. 5, 1999

[54] OPPORTUNISTIC USE OF PRE-CORRECTED DATA TO IMPROVE PROCESSOR PERFORMANCE

[75] Inventors: Leith Johnson; Stephen R. Undy, both of Fort Collins, Colo.

[73] Assignee: Hewlett-Packard Company, Palo Alto, Calif.

[21] Appl. No.: 08/759,583

[22] Filed: Dec. 5, 1996

[51] Int. Cl.[6] .................................................. G06F 11/00
[52] U.S. Cl. ............................................................ 714/48
[58] Field of Search ......................... 395/182.06, 185.02, 395/185.04, 185.06, 185.07; 371/40.2, 51.1, 40.11; 711/144, 146

[56] References Cited

PUBLICATIONS

C.M. Hsieh, P.C. Murley and R.R. O'Brien–Dynamics of Charge Collection from Alpha–Particle Tracks in Integrated Circuits IEEE/Proc. IRPS–pp. 38–42, Jun. 1981.

*Primary Examiner*—Robert W. Beausoliel, Jr.
*Assistant Examiner*—Pierre E. Elisca

[57] ABSTRACT

Disclosed herein are methods and apparatus which provide a processor with raw, uncorrected data. The uncorrected data (or pre-corrected data) is retrieved from memory and then "bypassed" to a processing unit before its error status is known. Concurrently, error correction hardware determines the data's error status. Since the correct/incorrect indication is the first result available from error correction hardware, this result may be used to gate the actions of a processing unit prior to its taking an irrevocable action with possibly incorrect data. If bypassed data is incorrect, processing unit control logic may flag it as such and read corrected data from the output of error correction hardware. If bypassed data is correct (as will usually be the case), bypassed data may be consumed by a processing unit in due course.

20 Claims, 8 Drawing Sheets

OPPORTUNISTIC USE OF PRE-CORRECTED DATA TO IMPROVE PROCESSOR PERFORMANCE

FIELD OF THE INVENTION

This invention pertains to the opportunistic use of pre-corrected data (sometimes referred to herein as "uncorrected data", "fetched data", or "raw data") to improve the performance of a microprocessor. More specifically, this invention pertains to methods and apparatus which 1) opportunistically bypass error correction hardware to provide a processing unit with fetched data more quickly, 2) signal a processing unit early on if data provided it via a bypass buffer is incorrect, and 3) replace erred data with corrected data when necessary.

BACKGROUND OF THE INVENTION

It is well known that computer memories are prone to occasionally generating "soft" or "transient" errors. Main store memories, which lie external to a microprocessor and store data for extended periods of time, are particularly susceptible to these errors. Secondary level cache memories can also develop soft errors.

Soft errors are typically caused by energetic particles which strike one or more of the semiconductor devices within a memory. Sources of these energetic particles are radioactive decay of packaging materials or cosmic rays. For a more detailed description of the causes of soft errors, and the efforts which have been taken to prevent them, see the U.S. patent application of Miller et al. (Ser. No. 08/603,977 filed Feb. 20, 1996) entitled "Completion Detection as a Means for Improving Alpha Soft-Error Resistance", and the article of C. M. Hsieh, P. C. Murley, and R. R. O'Brien entitled "Dynamics of Charge Collection from Alpha-Particle Tracks in Integrated Circuits". *IEEE/PROC. IRPS*, pp. 38–42, June 1981. Both of these documents are hereby incorporated by reference for all that they disclose.

As computer systems are very sensitive to the receipt of incorrect data, a single incorrect bit transmitted from memory will frequently lead to a catastrophic system failure (when the data is read and interpreted by a microprocessor). At the very least, the incorrect bit will result in a computer system calculating, displaying or further propagating an incorrect result.

Many modern computer systems provide a means for detecting and correcting soft errors found in external computer memory. While most of these error correction systems are capable of correcting a single erred bit, some may even correct multiple bit errors. Exemplary error correcting codes are discussed in W. Wesley Peterson and E. J. Weldon, Jr.'s, *Error-Correcting Codes*, 1972, and Shu Lin and Daniel J. Costello, Jr.'s, *Error Control Coding—Fundamentals and Applications*, 1983. These documents are also incorporated by reference for all that they disclose.

In a computer system comprising error correction hardware, data is read from an external memory array and then immediately processed by the error correction hardware. Corrected data output from the error correction hardware is typically stored in a first level cache memory before being written to a processor's register set. Although the error correction processing time is small, it is encountered each and every time an external memory access is made. In a system performing millions of memory accesses per second, the sum delay attributable to error correction hardware can be substantial.

The number of soft errors encountered can depend on, for example, the size of an external memory array, the amount of time for which data is stored in the array, the altitude at which the array is in operation, or the technology used to build the array. On average, however, soft errors occurring under normal operating conditions are relatively rare—typically occurring maybe once a month.

Given that a modern computer system performs millions of memory accesses per second, and the occurrence of soft errors is relatively rare, one can appreciate that the frequently encountered delay of error correction hardware is a large price to pay for the assurance of accurate data.

It is therefore a primary object of this invention to provide methods and apparatus which opportunistically provide a processor with pre-corrected data, thereby improving microprocessor performance.

It is a further object of this invention to provide methods and apparatus which provide pre-corrected data to a microprocessor, and then, if necessary, flag incorrect data as such prior to its consumption by the microprocessor.

It is an additional object of this invention to provide methods and apparatus which reduce the length of time a processing unit is stalled due to the unavailability of data.

SUMMARY OF THE INVENTION

In the achievement of the foregoing objects, the inventors have devised methods and apparatus which provide a processor with raw, uncorrected data. Uncorrected data is retrieved from memory and then "bypassed" to a processing unit before its error status is known. Concurrently, error correction hardware determines the data's error status. Since the correct/incorrect indication is the first result available from error correction hardware, this result may be used to gate the actions of the processing unit prior to its taking an irrevocable action with possibly incorrect data. If bypassed data is incorrect, processing unit control logic may flag it as such and read corrected data from the output of error correction hardware. If bypassed data is correct (as will usually be the case), the bypassed data is consumed by the processing unit in due course.

Although the error status of bypassed data may be determined very quickly, corrected data will typically be available 1–3 states later than bypassed data. As a result, providing a processing unit with bypassed data can significantly decrease the time for which a processing unit is stalled due to the unavailability of data.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings, in which.

DESCRIPTION OF THE PREFERRED EMBODIMENT

Figure 1:
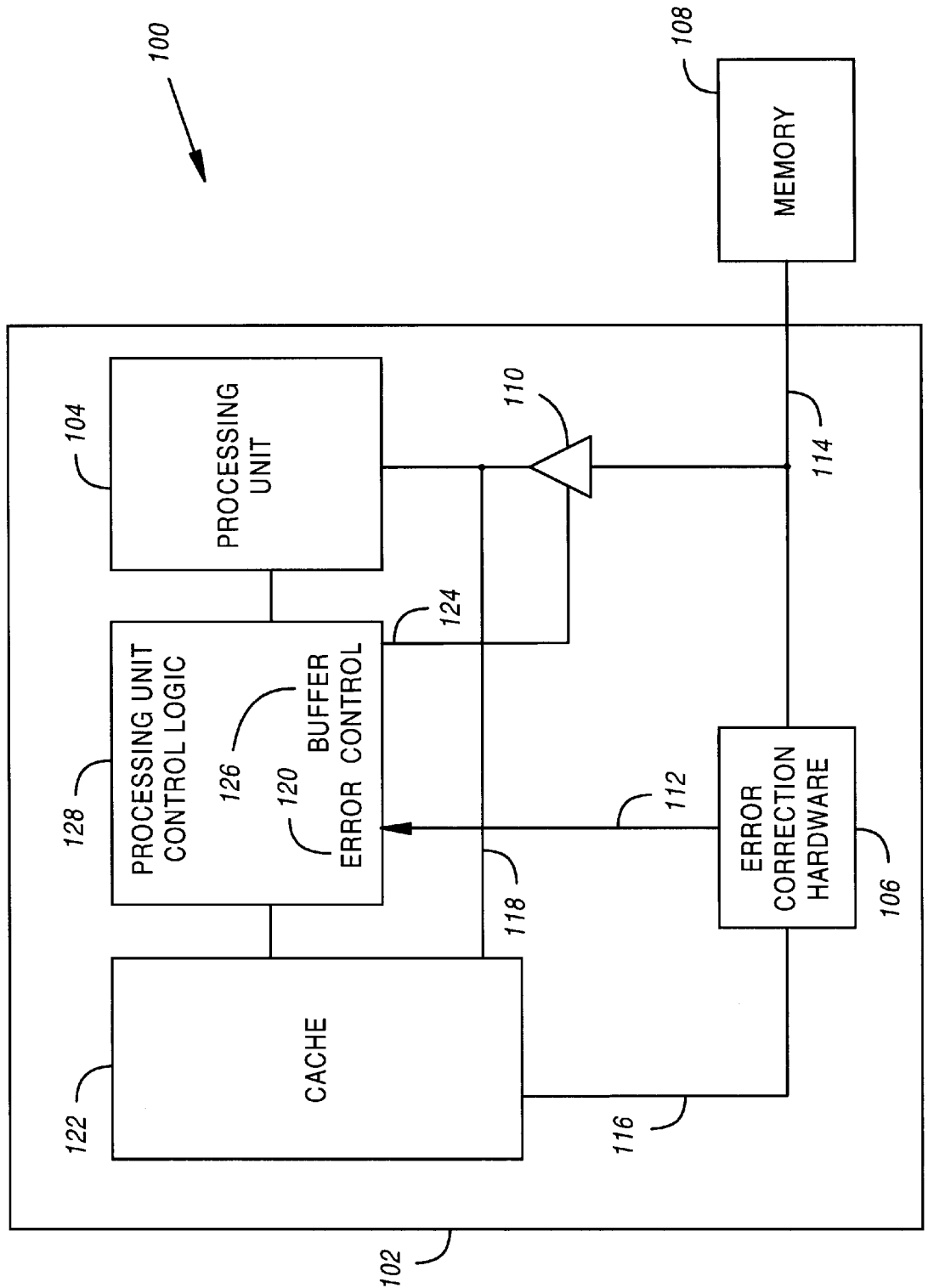
FIG. 1 is a schematic illustrating a preferred embodiment of error correction bypass hardware.
Figure 2:
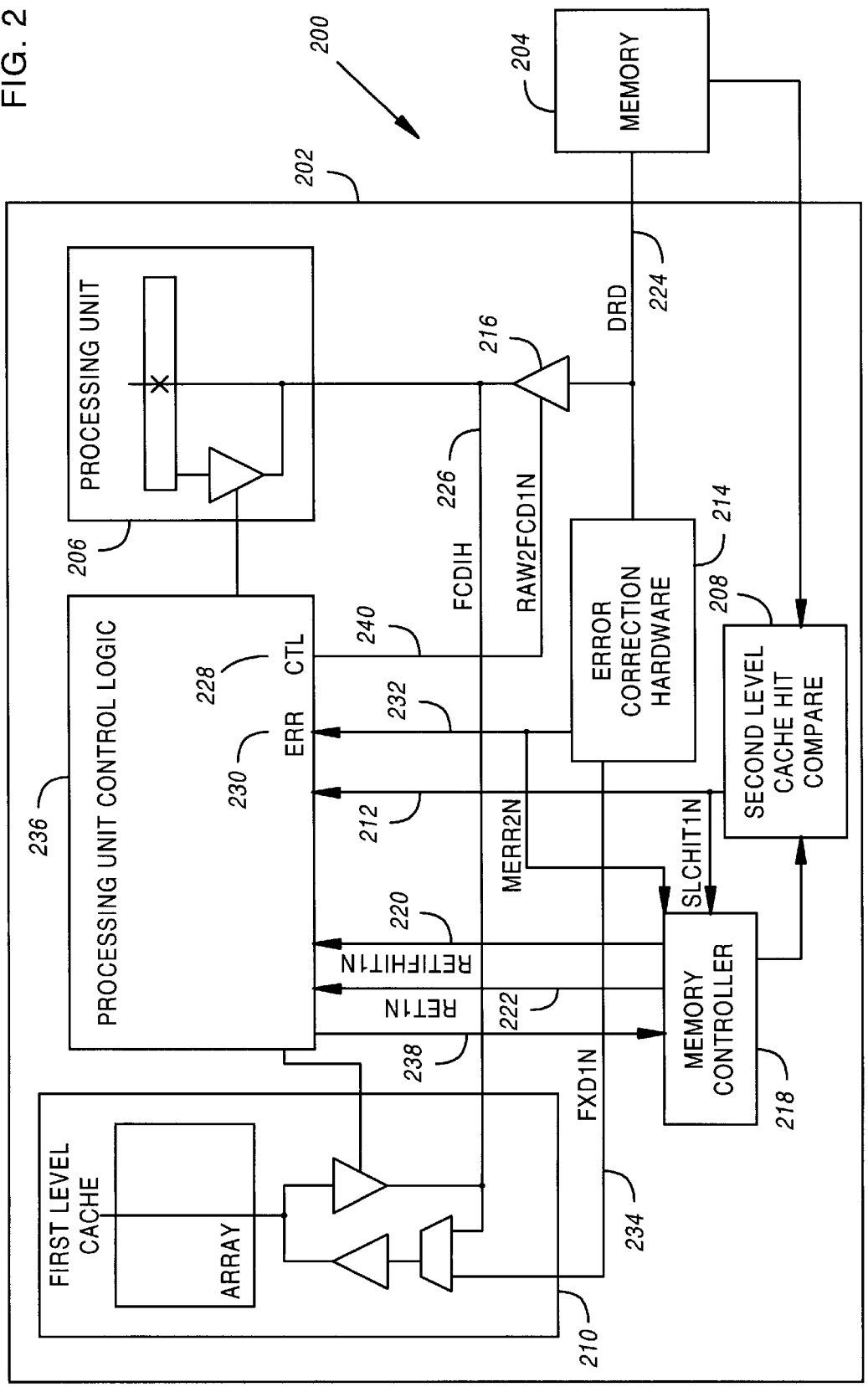
FIG. 2 is a schematic illustrating the hardware of FIG. 1 embodied in a modern computer system.
Figure 3:
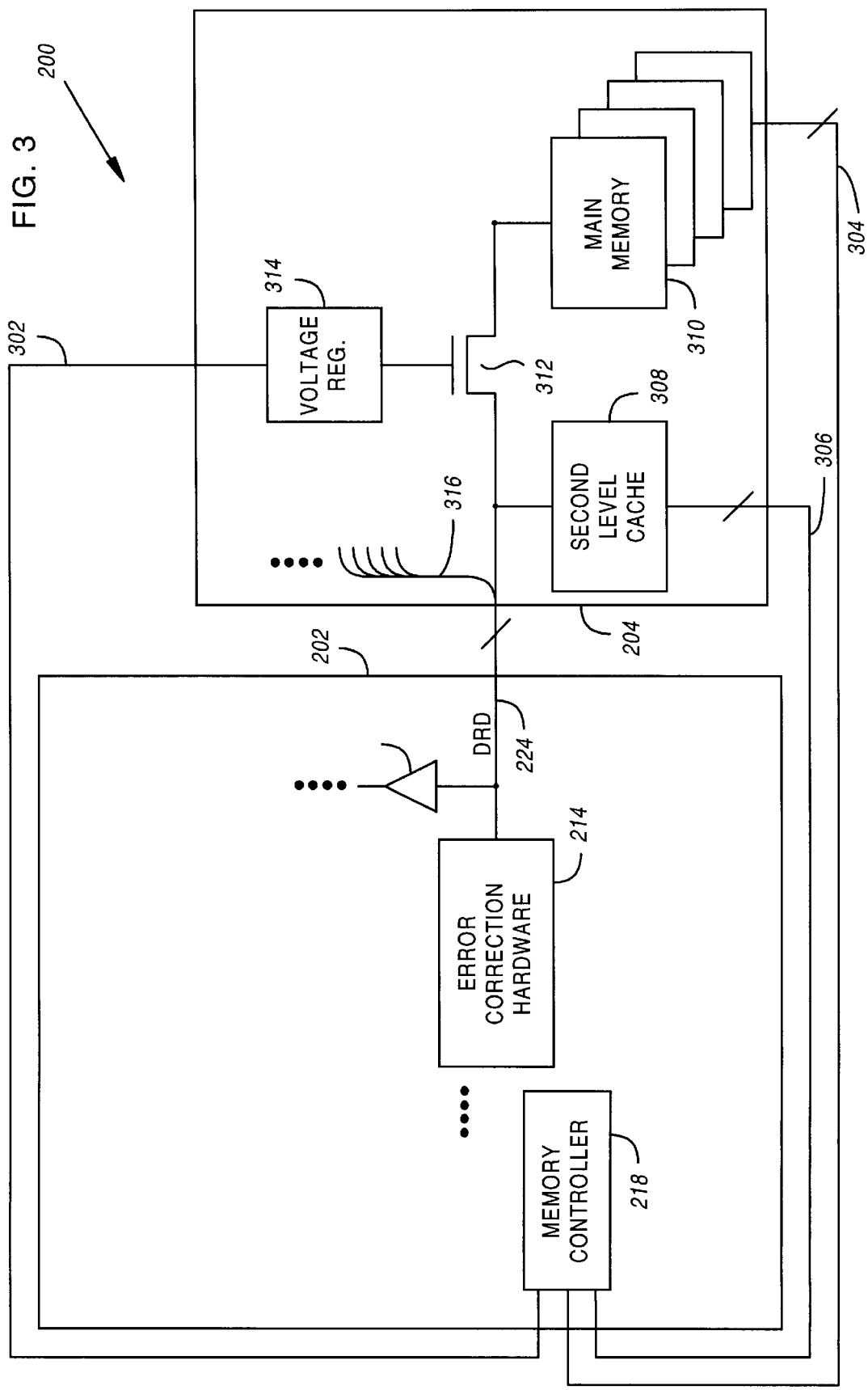
FIG. 3 is a schematic illustrating a preferred external memory configuration for the FIG. 2 computer system.

Apparatus 100 for providing a microprocessor 102 with pre-corrected data (sometimes referred to herein as "uncorrected data", "fetched data", or "raw data") is pictured in FIGS. 1–3, and may generally comprise a processing unit 104 with associated control logic 128, error correction hardware 106, a memory 108, and a bypass buffer 110. All of these components 104–110, 128 are coupled so that data fetched from the memory 108 may be simultaneously provided to the bypass buffer 110 and the error correction hardware 106. Furthermore, the components 104–110 are coupled 116, 118 so that fetched data may be provided to the processing unit 104 via the bypass buffer 110 and/or the error correction hardware 106. Signals 120 carried over an error line 112 connecting the error correction hardware 106 and processing unit control logic 128 determine whether the processing unit 104 will consume data which is provided to it via the bypass buffer 110.

Figure 10:
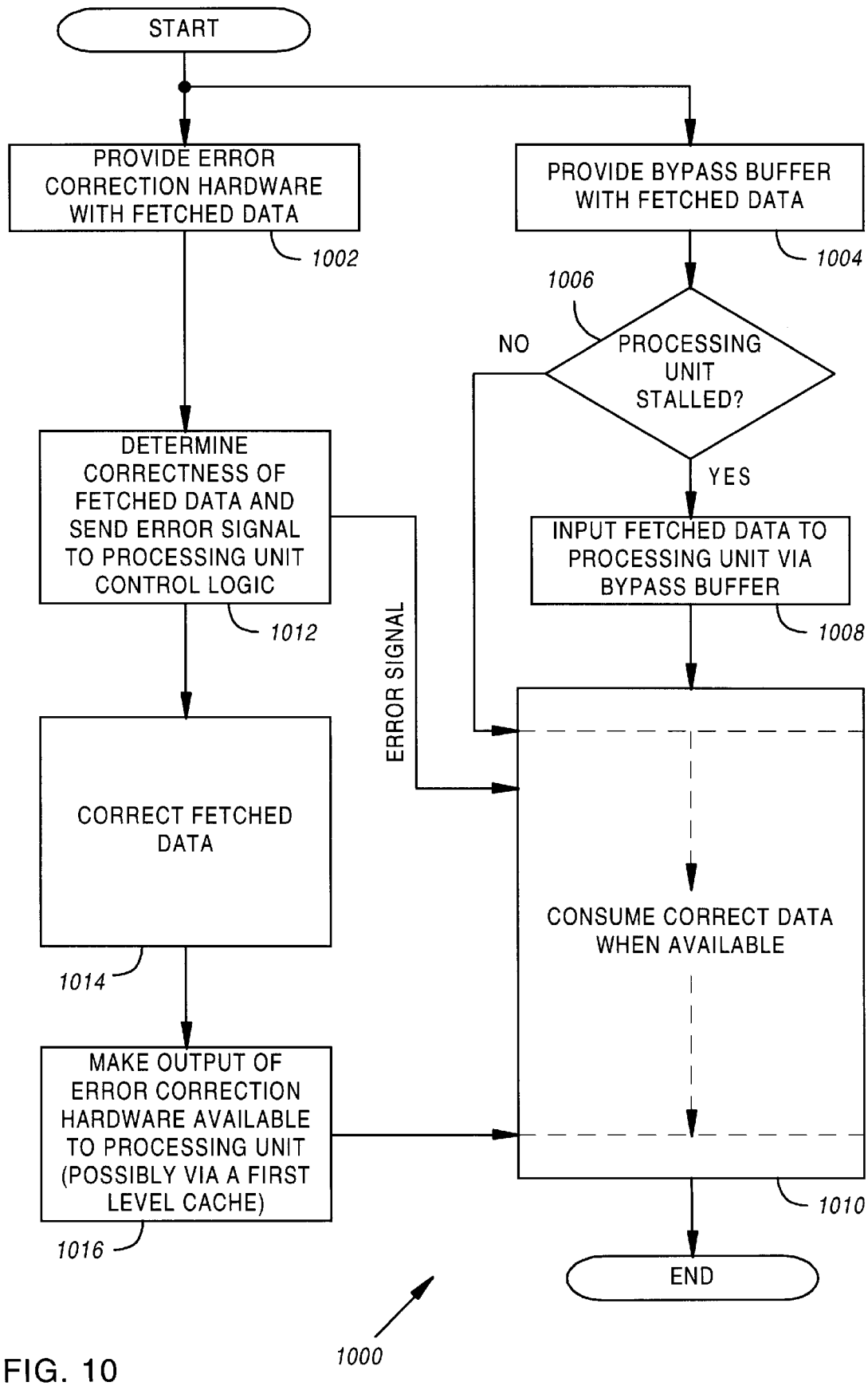
FIG. 10 is a flow chart illustrating a method for providing raw, uncorrected data to a microprocessor.

A method 1000 of providing raw, uncorrected data to a processing unit 104 of a microprocessor 102 (FIG. 1) is pictured in FIG. 10, and may generally comprise the following steps. Substantially simultaneously, data fetched from memory 108 is provided to 1002, 1004 both a bypass buffer 110 and error correction hardware 106. If the processing unit 104 is stalled 1006, the fetched data is input 1008 into to the processing unit 104 via a data bus 118 connecting the bypass buffer 110 to the processing unit 104. When fetched data is input 1002 into the error correction hardware 106, error correction schemes determine 1012 whether the fetched data is correct. If the fetched data is not correct, a signal 120 is sent 1012 to the processing unit 104 indicating that fetched data obtained via the bypass buffer 110 should be ignored. If fetched data was not input 1008 to the processing unit 104 via the bypass buffer 110, or if the processing unit 104 was signalled 1012 that fetched data was determined to be incorrect, corrected data is provided 1016 to the processing unit 104 via the error correction hardware 106.

Having described a method 1000 and apparatus 100 for providing raw, uncorrected data to a processor 102 in general, the method 1000 and apparatus 100 will now be described in further detail.

In a first preferred embodiment, the apparatus 100 described above is embodied in a computer system comprising a CPU 102 (i.e., a "central processing unit" or "microprocessor") and a memory 108. See FIG. 1. The CPU 102 comprises a processing unit 104, processing unit control logic 128, error correction hardware 106, and a bypass buffer 110. The CPU 102 may also comprise a cache 122, but need not. If the CPU 102 does comprise a cache 122, the error correction hardware 106 is preferably situated both logically and physically between the CPU's processing unit 104 and cache 122. Such a placement of the error correction hardware 106 helps to minimize the length of bus wires 114, 116 extending between the error correction hardware 106 and other components 108, 122 of the CPU 202.

The memory 108 will typically lie external to the CPU 102 (i.e., the CPU 102 and memory 108 will be implemented as distinct integrated circuits (ICs)) and may comprise additional cache memories and/or main memories. Via a memory bus 114, and in response to controls located internal or external to the CPU 102 (not shown), the memory 108 simultaneously drives 1002, 1004 (FIG. 10) data to the bypass buffer 110 and error correction hardware 106. [NOTE: Controls such as memory controls and processor controls 128 are standard CPU features, and should be well understood by one skilled in the art. As a result, they will not be discussed in great detail herein.]

Conventionally, data fetched from external memory 108 is either 1) always processed through error correction hardware 106, or 2) never processed through error correction hardware 106 (as is the case in many second level cache arrangements). When fetched data is processed by error correction hardware 106, it is then either 1) written to a cache 122, or 2) provided directly to a processing unit 104. In a system comprising a cache 122, data written to the cache 122 can be immediately fetched by a processing unit 104. Although the preceding arrangement of data flow insures that the processing unit 104 always receives correct data, it significantly impedes the flow of data between memory 108 and the processing unit 104.

Since data fetched from memory is nearly always correct (almost 100% of the time), it is desirable to avoid the penalty associated with error correction hardware 106 whenever possible. To this end, the apparatus 100 of FIG. 1 has been provided with a bypass buffer 110. Simultaneously with the flow of data through error correction hardware 106, fetched data may flow through the bypass buffer 110, onto a data bus 118, and into the processing unit 104.

To avoid conflicts occurring as a result of the bypass buffer 110 and cache 122 simultaneously attempting to drive the data bus 118, the processing unit 104 will preferably control 1006 the flow of data over the data bus 118 (possibly via processing unit control logic 128). If a processing unit 104 is associated with control logic 128, the control logic 128 may transmit signals 126 over a buffer control line 124, thereby enabling the bypass buffer 110 when the processing unit 104 is stalled (i.e., when the data bus 118 is not being driven by the cache 122 or processing unit 104). If the processing unit 104 is not available as data is being fetched, the processing unit control logic 128 disables the bypass buffer 110 and transfers 1016 data 106 to the processing unit 104 after it has been corrected via the error correction hardware 106.

Concurrently with the flow of data through the bypass buffer 110 (or if the processing unit 104 is not stalled, immediately after data is received by the CPU 102), one or more error correction schemes are applied 1014 to the fetched data by the error correction hardware 106. In this manner, the correctness of the fetched data is determined. An error signal 120 indicating whether fetched data is correct is the first signal to be generated by error correction hardware 106. This signal 120 is immediately transmitted 1012 to the processing unit's control logic 128, and is used to flag a register comprising recently bypassed data as being correct or incorrect. If bypassed data is correct, it may be immediately consumed 1010 by the processing unit 104. If bypassed data is incorrect, it is ignored by the processing unit 104.

Since a correct/incorrect indication is the first signal 120 to be output from error correction hardware 106, a stalled processing unit 104 may be able to consume bypassed data without having to suffer the delay imposed by error correction hardware 106. However, steps must be taken to insure that the processing unit 104 will not consume bypassed data until a correct/incorrect indication is received from the error correction hardware 106 (i.e., the processing unit 104 must verify the status of correct/incorrect flags or the like associated with fetched data).

Correction 1014 of fetched data is begun concurrently with the error correction hardware's transmission of an error signal 120 to the processing unit 104. A discussion of particular error correction schemes is beyond the scope of this document. However, various error correcting codes are noted in the Background portion of this document, supra.

Finally, corrected data is output from the error correction hardware 106 and transmitted via a bus 116 to an internal cache 122. From the cache 122, and only if correct data has not been provided to the processing unit 104 via the bypass buffer 110, corrected data is provided 1016 to the processing unit 104 via the data bus 118 (under the control of the processing unit control logic 128). Alternatively, and if an internal cache 122 does not exist, corrected data may be provided 1016 to the processing unit 104 directly from the error correction hardware 106.

In the above manner, fetched data is provided to 1008, 1016 and consumed 1010 by the processing unit 104 as quickly as possible (and usually in 1–3 fewer states than is possible in conventional computer systems). The delay of error correction hardware 106 is therefore only imposed when necessary, which is rare.

In a second preferred embodiment of the apparatus 100 described herein, the apparatus 200 is embodied in the computer system of FIG. 2. Again, the apparatus 200 comprises a CPU 202 connected to one or more external memories 204. Internal to the CPU 202 is a processing unit 206, processing unit control logic 236, a first level cache 210, error correction hardware 214, a bypass buffer 216, a memory controller 218, and a second level cache hit compare unit 208. [Note: If the processing unit 206 of the FIG. 2 computer system is assumed to be an integer processing unit, and the first level cache 210 is assumed to be a first level data cache, the architecture of the FIG. 2 computer system closely resembles that of the Hewlett-Packard PA-7300LC microprocessor.]

The processing unit 206 consumes data from the first level cache 210 until at some point it requires data which does not exist in the first level cache 210. Data is transmitted to the processing unit 206 via a data bus 226 denoted FCDIH in the drawings. Control logic 236 associated with the processing unit 206 maintains complete control over the data bus 226, and facilitates the transfer of data between the first level cache 210 and processing unit 206.

Figure 9:
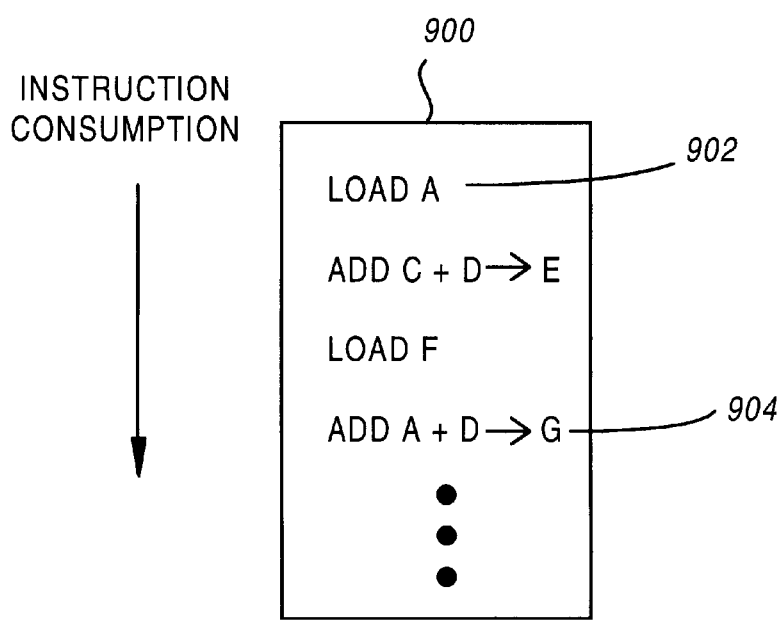
FIG. 9 is a flow diagram illustrating the consumption of data and instructions within the FIG. 2 computer system.

The processing unit 206, control logic 236, and first level cache 210 are designed to be "non-blocking". That is, if the first level cache "misses" (i.e., does not hold the data which a load or store instruction to be consumed by the processing unit 206 requires), the actions of the processor unit 206 will be gated so that it may consume instructions which do not depend on the missing data. A processing unit 206 can therefore continue its consumption of instructions until a dependency on the missing data develops. When such a dependency develops, the processing unit 206 stalls. Typically, an instruction compiler will generate load instructions 902 (FIG. 9) well before the loaded data is to be operated upon (i.e., added 904 to another operand, etc.). In this manner 900, it is possible that missing data might be retrieved from external memory 204 prior to a processing unit 206 stalling. However, a processing unit 206 will typically stall well before data missing from the first level cache 210 can be retrieved. It is therefore an object of this invention to minimize the time for which a processing unit 206 is stalled.

When data requested by the processing unit control logic 236 is not found in the first level cache 210, the control logic 236 transmits a request for the missing data to a memory controller 218 (via a request bus 238). Ideally, this request is transmitted in parallel with the processing unit's consumption of instructions which do not depend on the missing data.

After receiving a request for data, the memory controller 218 will initiate one or more memory accesses via appropriate address and control lines 304, 306 (FIG. 3). Whereas the processing unit control logic 236 maintains complete control over the FCDIH data bus 226, the memory controller maintains complete control over a bus 224 connecting external memory 204 to the CPU 202 (denoted DRD in the drawings), and a bus 234 for transmitting corrected data between the error correction hardware 214 and first level cache 210 (denoted FXD1N in the drawings). But for the processing unit control logic 236 notifying the memory controller 218 when data needs to be fetched, and the memory controller 218 notifying the control logic 236 when data is available, the two controllers 236, 218 are autonomous.

Assume that the external memory 204 of the FIG. 2 computer system comprises only main memory, and no second level cache. After a conventional memory read, data is driven to the external memory bus 224 (DRD in the drawings). Substantially simultaneously, this data is received at inputs to error correction hardware 214 and a bypass buffer 216. Since the processing unit control logic 236 maintains complete control over the data bus 226, it also controls whether the bypass buffer 216 is allowed to drive data to the FCDIH bus 226. Control over the bypass buffer is accomplished via a buffer control line 240 extending between the processing unit control logic 236 and the bypass buffer 216 (denoted RAW2FCD1N in the drawings). If the processing unit control logic 236 knows that the processing unit 206 is stalled (and the data bus 226 connecting the processing unit 206 to the first level cache 210 is therefore available), it transmits a signal 228 to the bypass buffer 216 indicating that the bypass buffer 216 can be enabled to transfer data to the processing unit 206.

Typically, and due to the very fast processing speeds of modern computers, a processing unit 206 will stall well in advance of the availability of fetched data, and the bypass buffer 216 will therefore be enabled. At the time fetched data is bypassed into the processing unit 206, its error status is unknown. Bypassed data is therefore held just long enough for its error status to be determined. If the data is correct, the processing unit 206 may be unfrozen well before fetched data is processed through error correction hardware 214 and written to the first level cache 210.

Simultaneously with the flow of data through the bypass buffer 216 (or alternatively, the prohibition of data flow through the bypass buffer 216), the error correction hardware 214 determines 1012 the error status of fetched data. Since data's error status (i.e., correct or incorrect) is the first information to be output from error correction hardware 214, a signal 230 indicating such is immediately transmitted 1012 to the processing unit control logic 236 via an error line 232. The error signal 230 may be used to qualify a clock which steps instructions through the processing unit 104. In this manner, bypassed data will only be consumed if it is determined to be error free. The error signal 230 may also be transmitted to the memory controller 218.

As data's error status is being transmitted to the processing unit control logic 236, fetched data is corrected 1014 via error correction schemes applied by the error correction hardware 214 (note that conventional microprocessors 202 apply error correction schemes to both correct and incorrect data). Various types of error correction may be implemented within the error correction hardware 214, some of which are detailed in the Background portion of this document, supra.

Once corrected, and approximately one state after fetched data is input into the CPU 202, fetched data is transmitted to the first level cache 210 via the corrected data bus 234 (FXD1N). When corrected data is received by the first level cache, it may be immediately relayed to the processing unit 206 under control of the processing unit control logic 236 (if correct data was not earlier bypassed to the processing unit 206). The processing unit 206 will unfreeze as soon as the corrected data is provided to it.

Since the memory controller 218 is in complete control of the external memory bus 224, DRD, it knows exactly when data will appear on the DRD bus 224. It may therefore notify the processing unit control logic 236 of said presence of data in the same state that the data appears on the DRD bus 224. In FIG. 2, the line 222 for transmitting this notification is designated RET1N.

By monitoring the RET1N line 222, the processing unit control logic 236 can determine whether it bypassed data into the processing unit 206 during the same state. If it did, the control logic 236 simply awaits an error signal 228 from the error correction hardware 214. If the error signal 228 indicates that fetched data is correct, the processing unit 206 may be unfrozen, and bypassed data will be consumed. If the signal 228 indicates that fetched data is incorrect, bypassed data is flagged as such (or abandoned), and the processing unit control logic 236 (and processing unit 206) wait to receive corrected data via the error correction hardware 214. If bypassed data is erred, the processing unit 206 remains frozen.

Figure 4:
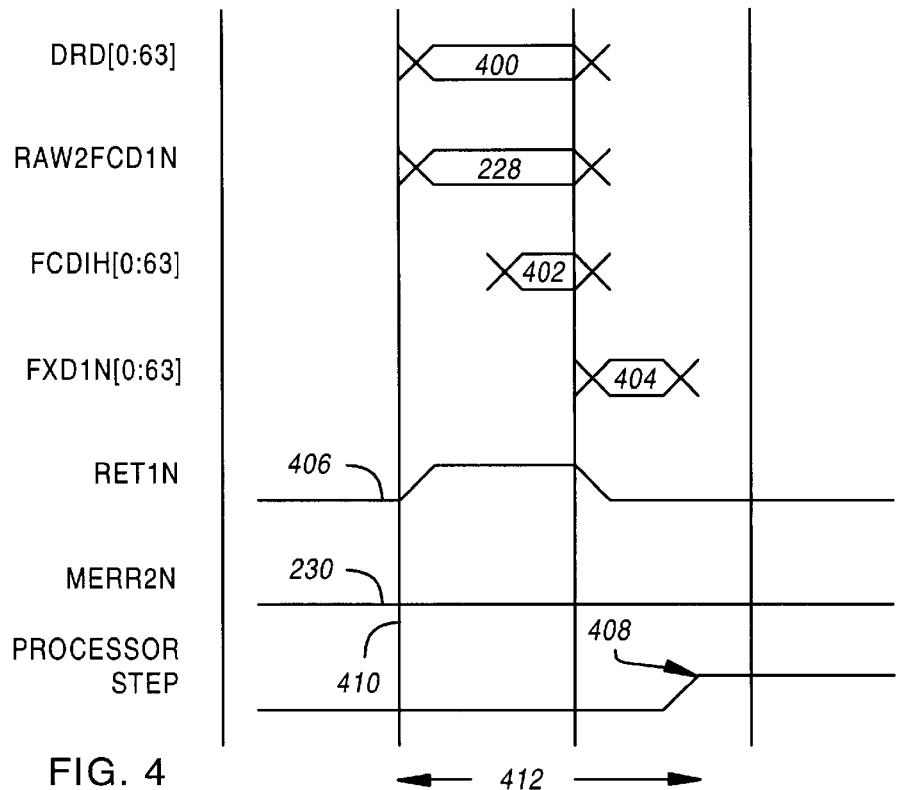
FIG. 4 is a graph illustrating the relative timing of control signals with respect to data availability when the FIG. 2 computer system retrieves error free data from main memory.
Figure 5:
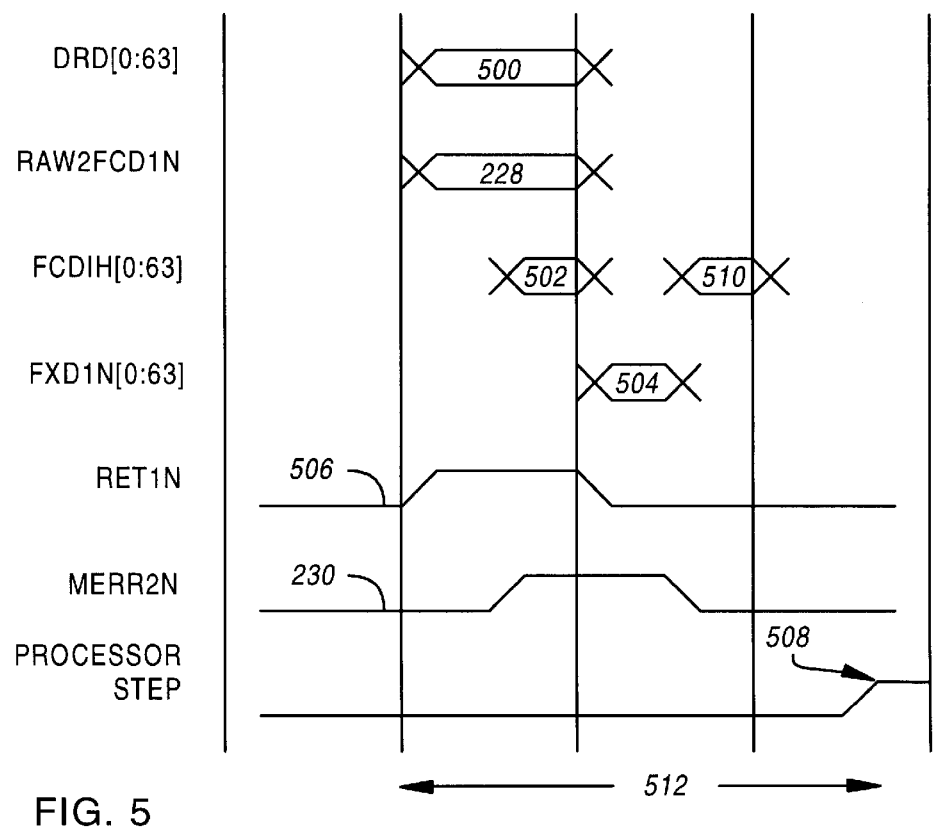
FIG. 5 is a graph illustrating the relative timing of control signals with respect to data availability when the FIG. 2 computer system retrieves erred data from main memory.

A read of main memory 204, with a return of data via a bypass buffer 216, is summarized in the graphs of FIGS. 4 and 5. FIG. 4 illustrates the timing of control signals with respect to data availability when fetched data is error free, and FIG. 5 illustrates the timing of control signals with respect to data availability when fetched data is erred. Note that FIG. 4 represents the typical case, since errors are rare.

In FIG. 4, data 400 appears on the external memory bus 224 (DRD) at some point in time (410). At least as early as this point 410, a signal 228 must be received by the bypass buffer 216 indicating that it is okay to transmit fetched data 400 to the processing unit 206. Since the memory controller 218 controls the DRD bus 224, and is aware of when data will be transmitted on same, it signals 406 the presence of data 400 to the processing unit control logic 236 via the RET1N line 222. Approximately one-half state after data 400 appears on the DRD bus 216, it appears 402 on the FCDIH data bus 226 (via the bypass buffer 216). A half state later, corrected data 404 appears on the FXD1N bus 234. However, since an error signal 230 was not received via the MERR2N error line 232, the corrected data 404 is merely written into the first level cache 210. The above sequence of events allows fetched data 402 to be consumed in response to a processor step 408 occurring approximately 2½ states after data 400 first appeared on the external memory bus 224.

In FIG. 5, data 500 again appears on the external memory bus 224 (DRD), and at approximately the same time, a signal 228 is received by the bypass buffer 216 indicating that it is okay to transmit the fetched data 500 to the processing unit 206. The memory controller 218 also signals 506 the presence of data 500 to the processing unit control logic 236, and approximately one-half state after data 500 appears on the DRD bus 216, it appears 502 on the FCDIH data bus 226. However, this time the data 502 is found to be erred. In response to a signal 230 carried on the MERR2N error line 232, the data 502 bypassed to the processing unit 206 is therefore abandoned. A half state later, corrected data 504 appears on the FXD1N bus 234. Since bypassed data 502 was erred, the corrected data is not only written to the first level cache 210, but also transferred to the processing unit 206. As a result, fetched data 510 may be consumed in response to a processor step 508 occurring approximately 2½ states after data 500 first appeared on the external memory bus 224. Note that the delay 412 associated with the consumption of correct bypass data 402 is significantly less than the delay 512 associated with the consumption of corrected data 510.

Now consider that the external memory 204 of the FIG. 2 computer system 200 comprises a second level cache 308, in addition to main memory 310. Most data required by the processing unit 206 is obtained from the CPU's first level cache 210. However, when the first level cache 210 "misses", the second level cache 308 and main memory 310 alternately provide data to the CPU 202 in response to addressing and control signals 304, 306 relayed by the memory controller 218. When the first level cache 210 misses, and if possible, data is fetched from the second level cache 308. Only as a last resort is data fetched from the much slower main memory 310.

The transmission of data from external memory 204 may occur over a plurality of memory bus lines 316 incorporating switching fets 312 controlled by one or more voltage regulators 314, as is more fully described in the U.S. patent application of Johnson (Ser. No. 08/733,483 filed Oct. 18, 1996) entitled "Transistor Switch Used to Isolate Bus Devices and/or Translate Bus Voltage Levels".

For the most part, data fetched from a second level cache 308 is processed similarly to data fetched from main memory 310. However, a few differences in the way second level cache data is handled should be noted. When a second level cache 308 is accessed, two processes proceed in parallel. The processes include a data access and a tag access. Although a memory controller 218 will know where in a cache 308 data is stored (if it is stored in the cache 308), it will typically not know whether the data stored at a specific address is the data requested by the processing unit control logic 236. The memory controller 218 will therefore access data and tag arrays simultaneously. When data is to be transmitted by the second level cache 308, the memory controller alerts the processing unit control logic 236 by asserting the RETIFHI1N line 220. The control logic 236 then knows that data is available for bypass, but that it is not currently known whether the data is a "hit" (i.e., a match to the data which was requested). Meanwhile, tag data is received by a second level cache hit compare unit 208. This unit 208 compares the fetched tag data to requested tag data and sends a signal on the SLCHIT1N line 212 indicating whether a tag match was found. If a hit is indicated, the processing unit control logic 236 may proceed with consumption of correct bypass data (i.e., the control logic 236 must wait for an indication as to bypassed data's correctness, but may then allow the data to be consumed). If a miss is indicated, the processing unit control logic 236 knows not to use bypassed data, and realizes that corrected data will not be available on the corrected data bus 234. When the memory controller 218 is signaled that a miss was encountered, it proceeds with fetching data from main memory 310.

Figure 6:
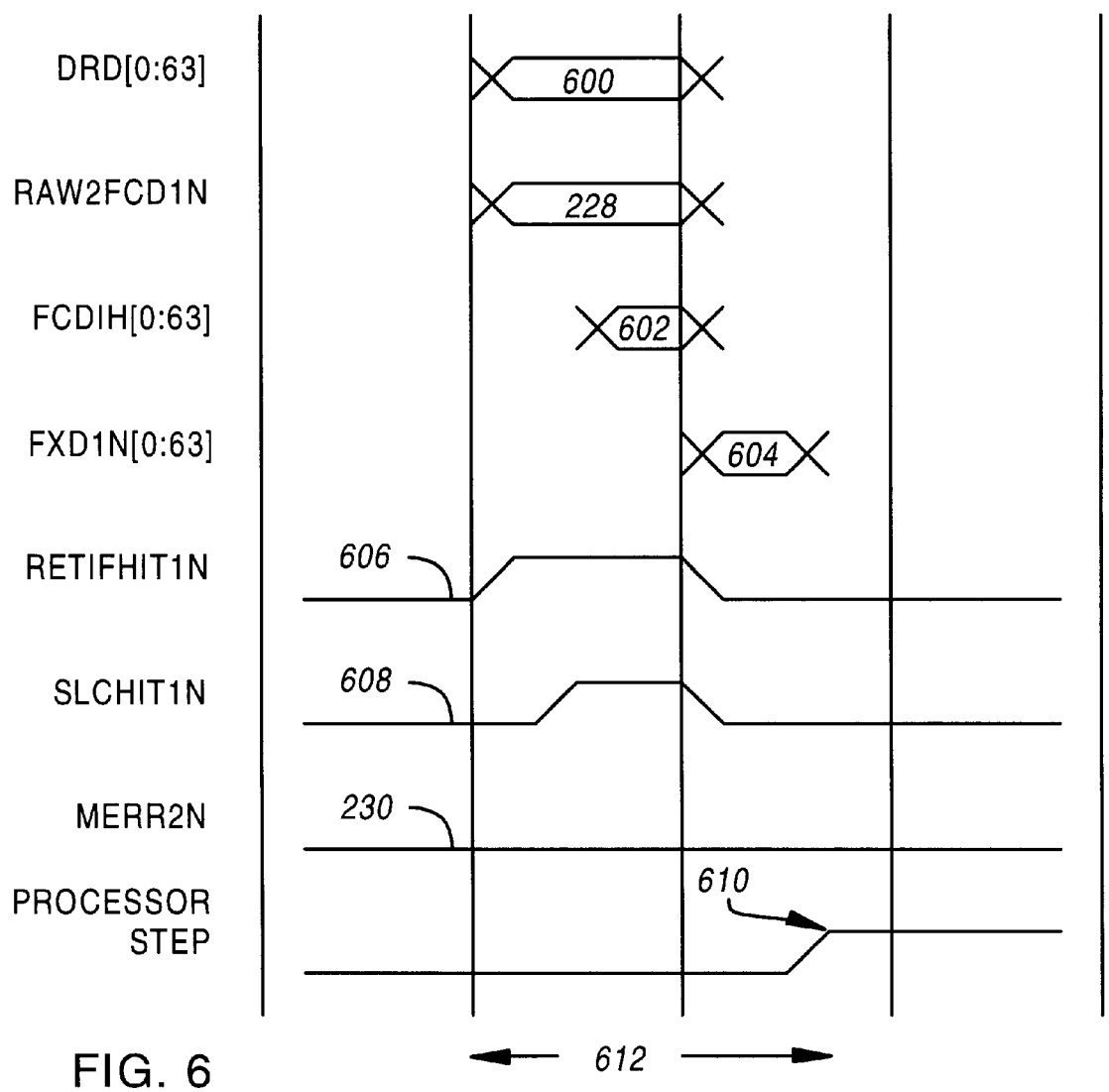
FIG. 6 is a graph illustrating the relative timing of control signals with respect to data availability when the FIG. 2 computer system retrieves error free data from a secondary level cache.
Figure 7:
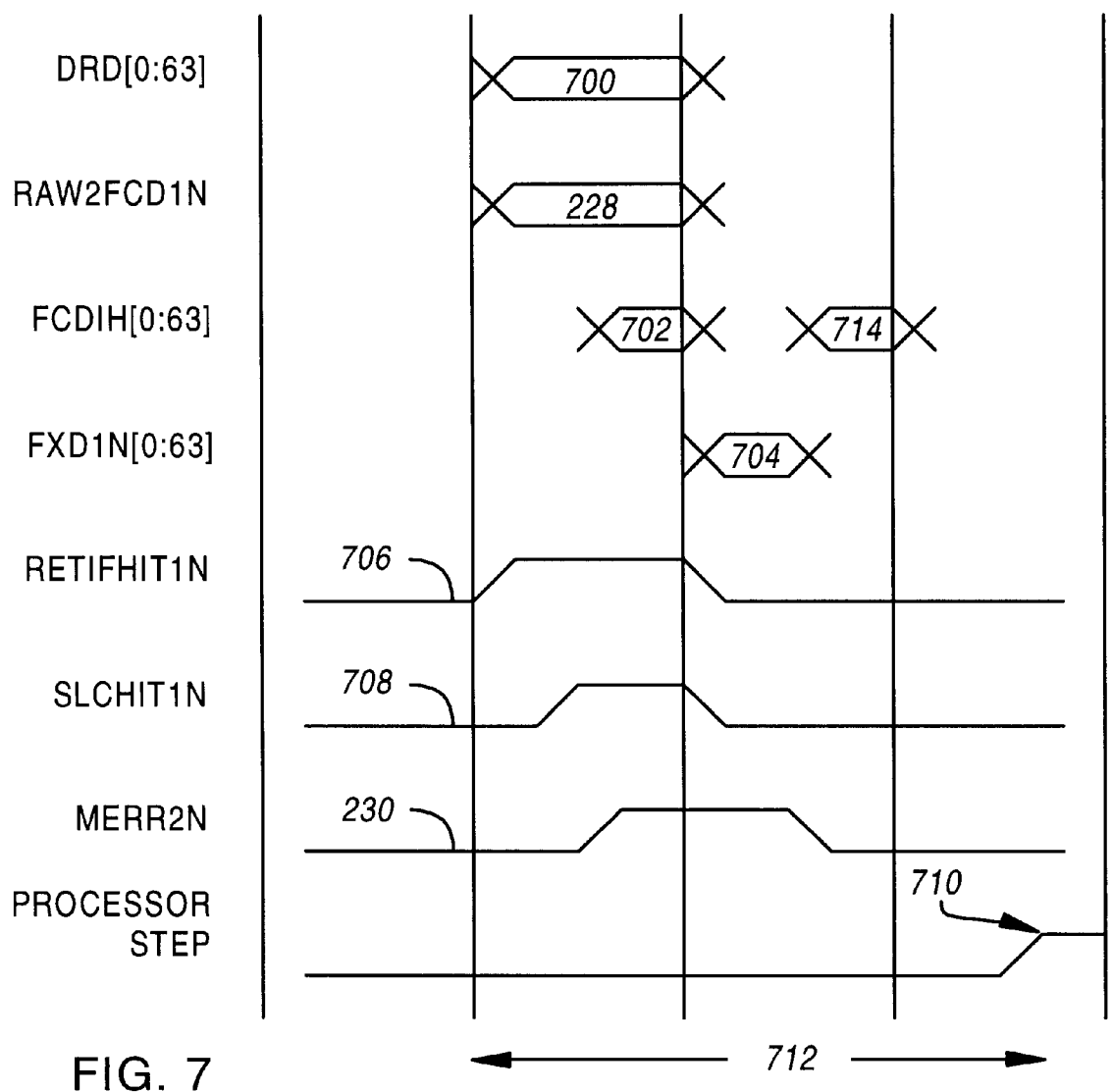
FIG. 7 is a graph illustrating the relative timing of control signals with respect to data availability when the FIG. 2 computer system retrieves erred data from a secondary level cache.
Figure 8:
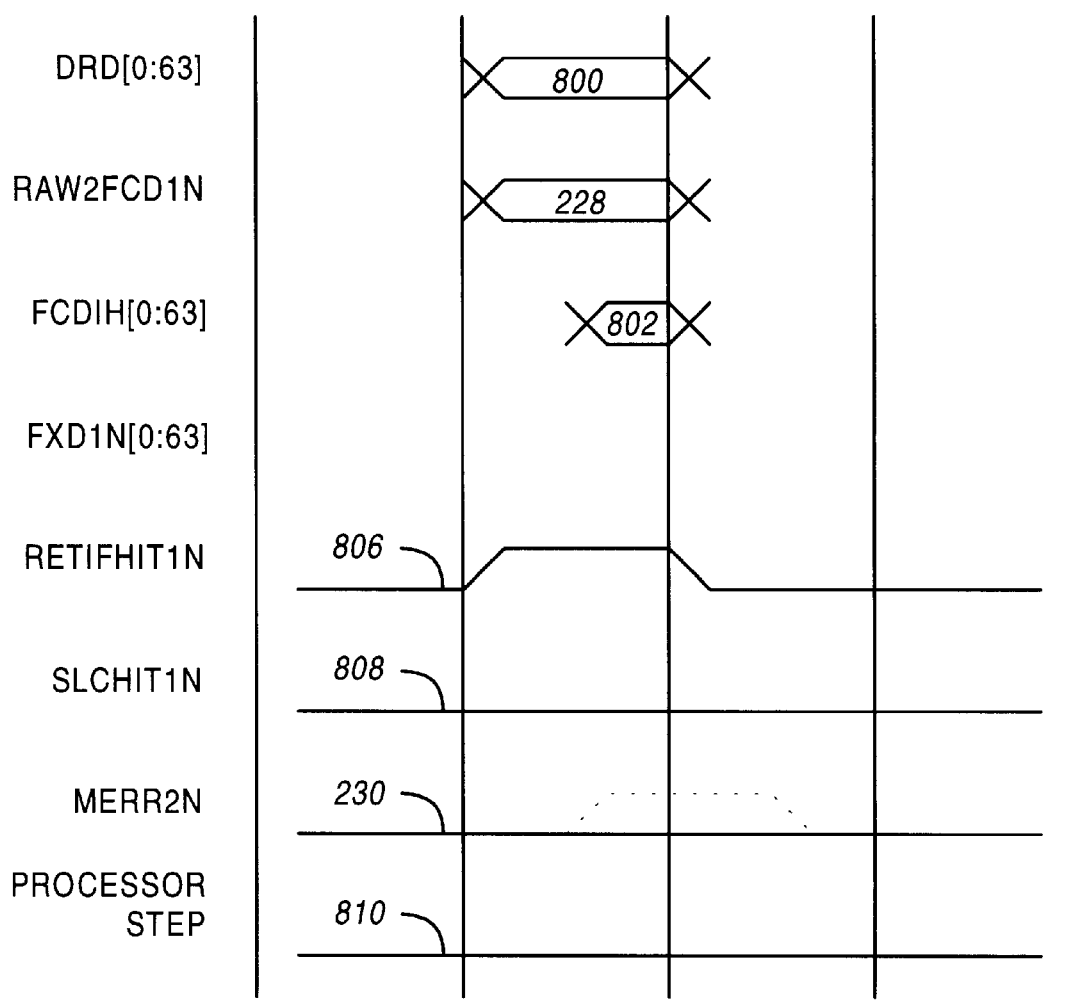
FIG. 8 is a graph illustrating the relative timing of control signals with respect to data availability when the FIG. 2 computer system encounters a "miss" while accessing a secondary level cache.

The timing of control signals and data availability with respect to second level cache accesses are shown in FIGS. 6–8. FIG. 6 illustrates a second level cache hit without error, FIG. 7 illustrates a second level cache hit with error, and FIG. 8 illustrates a second level cache miss.

As in main memory accesses, processing unit control logic 236 is notified 606 as soon as data 600 is driven to the external memory bus 224 (although this time, via the RETIFHIT1N line 220), and fetched data 600 is bypassed in response to a notification 228 transmitted by the processing unit control logic 236 over the RAW2FCD1N line 240. If data 600 is bypassed, it appears 602 on the FCDIH data bus 226 approximately one-half state after it appears on the external memory bus 224. Substantially simultaneously, the error status of fetched data 600 is determined, and a tag compare is completed. If the result 608 of the tag compare indicates a hit, and fetched data 600 is determined to be error free 230, bypassed data 602 may be immediately consumed by the processing unit 206. Although corrected data 604 appears on the corrected data bus 234 one state after fetched data 600 is received into the CPU 202, the corrected data 604 is merely written to first level cache 210 and held for later use.

When a second level cache 308 transmits erred data, the processing unit control logic 236 is again notified 706 of the presence of data 700 on the external memory bus 224, and fetched data 700 is again bypassed in response to a signal 228 carried over the buffer control line 240. However, this time data 700 is found to be erred 230, and bypassed data 702 is therefore abandoned irregardless of whether a hit 708 is indicated. As a result, the processing unit 206 waits for corrected data 704 to be 1) written to the first level cache 210, and 2) transmitted 714 via the FCDIH data bus 226. As with main memory accesses, note that correct bypass data 602 may be consumed much more quickly 612, 712 than corrected data 714.

When a second level cache 308 miss is encountered, the processing unit control logic 236 is first notified 806 of the presence of data 800 on the external memory bus 224, and if possible, fetched data 800 is bypassed into the processing unit 206. However, a hit signal will not be received 808 by the processing unit control logic 236, and bypassed data 802 will therefore be abandoned. In the case of a miss, corrected data does not appear on the corrected data bus 234, and the memory controller 218 proceeds to access main memory 310.

In a CPU 202 such as that shown in FIG. 2, data obtained from either the second level cache 308 or main memory 310 is received into the CPU 202 via a bus 224 comprising package pins surrounding the right-most portion of the CPU's perimeter (note that the external memory bus 224, corrected data bus 234, and FCDIH data bus 226 all comprise multiple lines, but are represented in the drawings as singular lines). This data is then funneled through error correction hardware 214 located centrally within the CPU's IC package. From there, it is bused to a first level cache 210 comprising the left-most surface area of the CPU 202, and then bused back to a processing unit 206 located on the right-most half of the CPU 202. One can appreciate that without a means for bypassing the error correction hardware 214, fetched data would always pay a significant routing penalty prior to its receipt by the processing unit 206. In the case of main memory accesses, this penalty might be negligible in comparison to the fifteen or so state delay incurred in driving data from main memory 310 to the external memory bus 224. However, in the case of second level cache accesses, the routing penalty is significant. A second level cache 308 might incur only a three state delay in driving data to the memory bus 224. Even if data can be routed back and forth across the CPU 202 in as little as one state, a delay increase on the order of 33% results. This is a penalty which can be frequently if not always avoided through the use of a bypass buffer 216 as shown.

In conclusion, note that conventional processing systems incorporating an error correction scheme always require that a processing unit 206 wait for corrected data. The systems 100, 200 described herein only require a wait when corrected data in fact differs from data fetched from memory 204. Since soft errors might only occur once a month, the processor's receipt of trillions of data bypasses represents a significant performance advantage over previous computer system architectures.

In a processor comprising more than one processing unit, the teachings of this invention could be applied to supply bypassed data to each of the processor's processing units. Furthermore, in a processor wherein processing unit control logic has complete control over a data bus connecting a first level cache and bypass buffer to a processing unit, the teachings of this invention could be applied to allow data bypasses whenever the data bus is available, rather than only when the processing unit is stalled. However, the speed at which processing unit's can consume data is currently much greater than the speed at which external memory can be accessed. This improvement may therefore have limited value, as a processing unit will typically stall well in advance of the availability of fetched data (and the data bus will therefore most always be available for bypass data).

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Computer apparatus, comprising:
   a) a processing unit with associated control logic;
   b) error correction hardware;
   c) a memory; and
   d) a bypass buffer;
   all coupled so that data fetched from the memory may be:
   i) simultaneously provided to the bypass buffer and the error correction hardware; and
   ii) provided to the processing unit via a first data path comprising the bypass buffer but not the error correction hardware, or a second data path comprising the error correction hardware but not the bypass buffer;
   wherein signals carried over an error line connecting the error correction hardware and processing unit control logic determine whether the processing unit consumes data which is provided to it via the bypass buffer.

2. Computer apparatus as in claim 1, wherein:

signals carried over a buffer control line connected between the processing unit control logic and the bypass buffer determine whether the processing unit receives data via the bypass buffer.

3. Computer apparatus as in claim 1, further comprising:
   a) a cache;
   b) a corrected data bus connecting the error correction hardware to the cache; and
   c) a data bus connecting both the cache and the bypass buffer to the processing unit.

4. Computer apparatus as in claim 3, wherein:

signals carried over a buffer control line connected between the processing unit control logic and the bypass buffer:
   a) indicate whether the processing unit is currently stalled; and
   b) determine whether the processing unit receives data via the bypass buffer.

5. Computer apparatus as in claim 3, wherein:
   a) a memory bus connects the memory to both the bypass buffer and error correction hardware; and
   b) the apparatus further comprises a memory controller, interconnected with the error correction hardware and the memory so as to control the flow of data over the memory and corrected data buses.

6. Computer apparatus as in claim 5, wherein:

the memory controller is further interconnected with the processing unit control logic.

7. Computer apparatus as in claim 5, wherein:

the processing unit control logic is interconnected with the processing unit, the cache, and the bypass buffer so as to control the flow of data over the data bus.

8. Computer apparatus as in claim 3, wherein:
   a) the cache is a first level cache;
   b) the memory comprises a secondary level cache and a main memory, both of which are connected to a shared memory bus; and
   c) data is fetched,
      i) from the first level cache if stored therein;
      ii) from the second level cache if not stored in the first level cache; and
      iii) from the main memory if not stored in either the first or second level cache.

9. Computer apparatus as in claim 1, wherein:

the processing unit, processing unit control logic, and cache are non-blocking.

10. Computer apparatus as in claim 9, wherein:

the processing unit is an integer unit.

11. Computer apparatus as in claim 1, wherein:
   a) data provided to the processing unit is stored in one of a plurality of registers; and
   b) registers to which fetched data is written, via either the bypass buffer or error correction hardware, are independently addressed.

12. A method of providing a processing unit of a microprocessor with pre-corrected data, the method comprising the steps of:
   a) simultaneously providing both a bypass buffer and error correction hardware with data fetched from memory;
   b) if the processing unit is stalled, inputting the fetched data into the processing unit via a data bus connecting the bypass buffer to the processing unit;
   c) determining whether the fetched data is correct, and if the fetched data is incorrect, signaling the processing unit that data provided to it via the bypass buffer is incorrect; and
   d) if fetched data was not input to the processing unit via the bypass buffer, or if the processing unit was signalled in step c) that fetched data was determined to be incorrect, providing corrected data to the processing unit via the error correction hardware.

13. A method as in claim 12, wherein:
   a) the step of determining whether the data bus is currently available comprises the step of generating a buffer control signal, said buffer control signal being indicative of the outcome of said bus availability determination; and
   b) the method further comprises the step of transmitting said buffer control signal to the bypass buffer.

14. A method as in claim 12, further comprising the steps of:
   a) using a memory controller to control accesses to memory; and
   b) using processing unit control logic to control the data bus.

15. A method as in claim 12, wherein the step of determining whether the fetched data is correct comprises the steps of:
   a) generating an error signal indicative of the fetched data's correctness; and
   b) transmitting said error signal to control logic associated with the processing unit.

16. A method as in claim 12, wherein the step of signaling the processing unit that data provided to it via the bypass buffer is incorrect comprises:

flagging an appropriate register of the processing unit as comprising incorrect data.

17. A method as in claim 12, further comprising the step of:

halting a processor pipeline within the processing unit if,
   a) a next instruction to be consumed in the processor pipeline requires fetched data; and
   b) said fetched data has not been,
      i) input to the processing unit via the bypass buffer and data bus, and determined to be correct; or
      ii) input to the processing unit via the error correction hardware and data bus.

18. A method as in claim 12, wherein:
   a) the method further comprises the step of correcting errors in fetched data using the error correction hardware; and
   b) the step of correcting errors in fetched data is begun concurrently with the step of signaling the processing unit that data provided to it via the bypass buffer is incorrect.

19. A method as in claim 12, wherein the step of providing corrected data to the processing unit via the error correction hardware and data bus comprises:
   a) writing corrected data output from the error correction hardware to a cache; and
   b) transmitting corrected data which was stored in the cache to the processing unit via the data bus.

20. A method of providing a processing unit of a microprocessor with pre-corrected data, the method comprising the steps of:

a) simultaneously providing both a bypass buffer and error correction hardware with data fetched from memory;

b) if a data bus connecting the bypass buffer to the processing unit is currently available, inputting the fetched data into the processing unit via a data bus connecting the bypass buffer to the processing unit;

c) determining whether the fetched data is correct, and if the fetched data is incorrect, signaling the processing unit that data provided to it via the bypass buffer is incorrect; and d) if fetched data was not input to the processing unit via the bypass buffer, or if the processing unit was signalled in step c) that fetched data was determined to be incorrect, providing corrected data to the processing unit via the error correction hardware.

* * * * *